May 30, 1933.  E. P. L. LE BARBIER  1,911,320
STEREOSCOPIC PHOTOGRAPHY
Filed Feb. 5, 1929  3 Sheets-Sheet 1
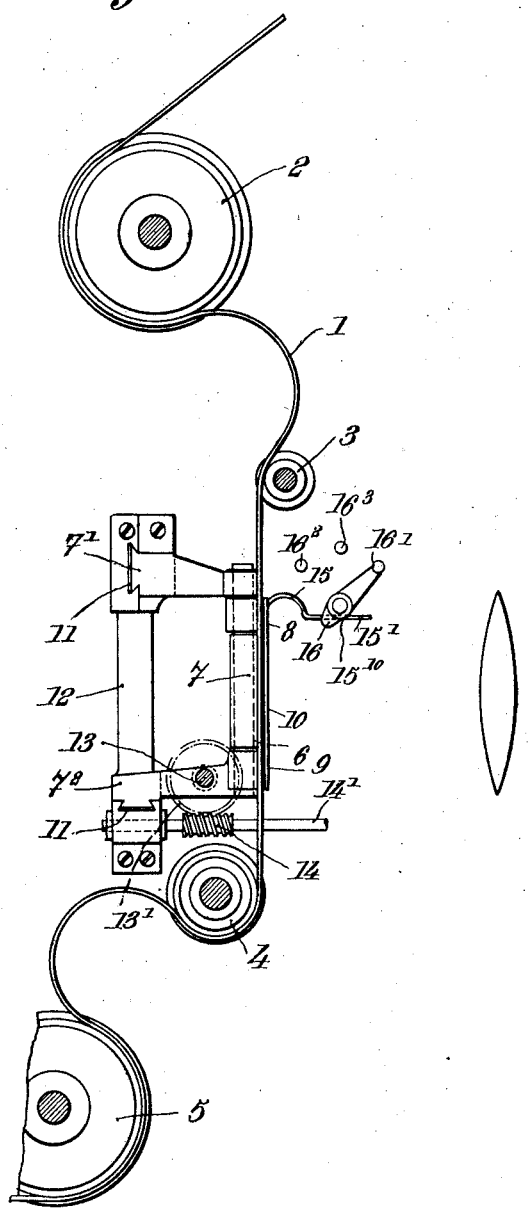
Inventor:
Emile P.L. LeBarbier,
Att'y.

May 30, 1933.  E. P. L. LE BARBIER  1,911,320
STEREOSCOPIC PHOTOGRAPHY
Filed Feb. 5, 1929   3 Sheets-Sheet 2
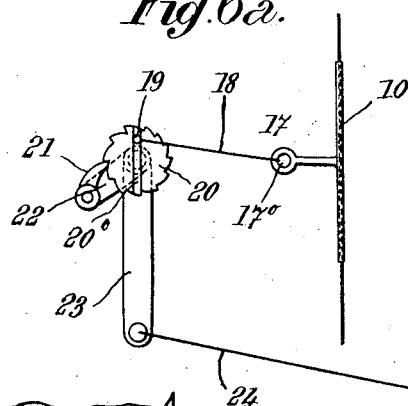
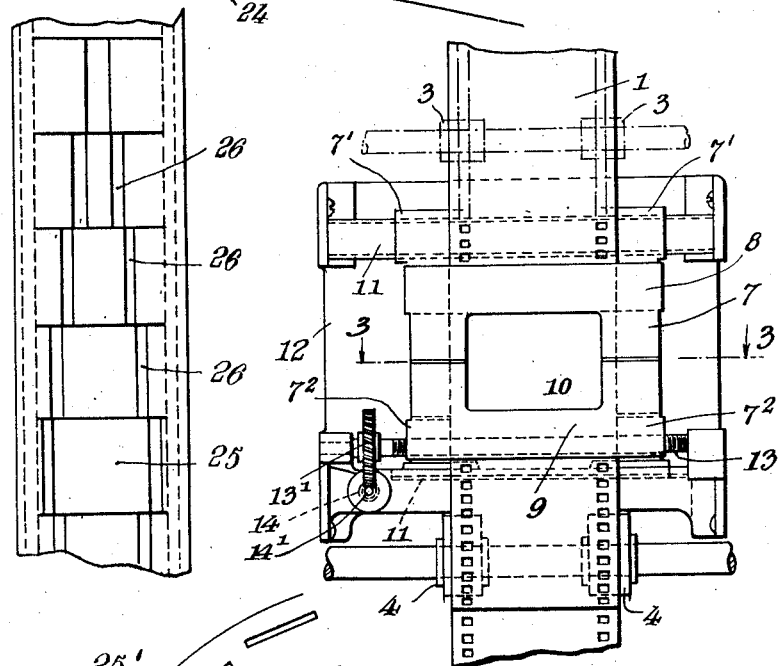
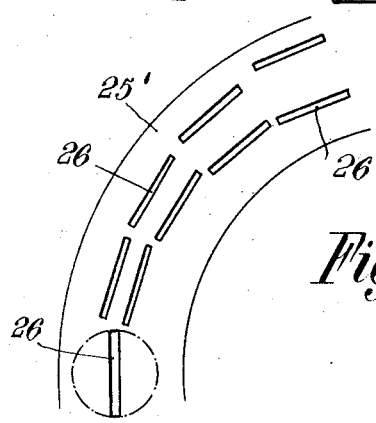
Inventor:
Emile P. L. Le Barbier,
Att'y.

May 30, 1933.  E. P. L. LE BARBIER  1,911,320
STEREOSCOPIC PHOTOGRAPHY
Filed Feb. 5, 1929   3 Sheets-Sheet 3
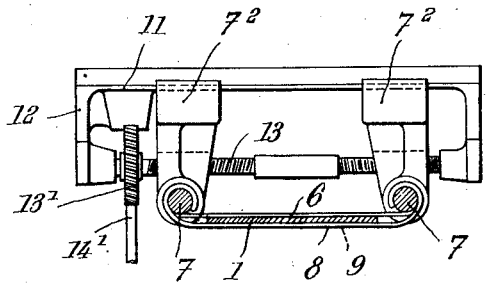
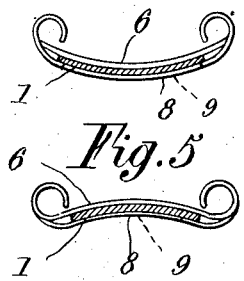
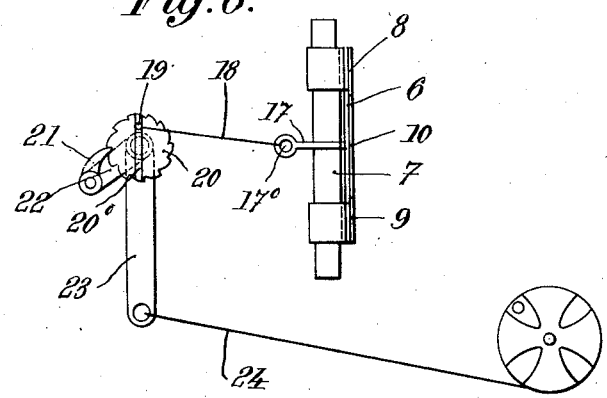
Inventor:
Emile P. L. Le Barbier,
Att'y.

Patented May 30, 1933

1,911,320

UNITED STATES PATENT OFFICE

EMILE PIERRE LOUIS LE BARBIER, OF NICE, FRANCE

STEREOSCOPIC PHOTOGRAPHY

Application filed February 5, 1929, Serial No. 337,686, and in Belgium March 30, 1928.

The present invention relates to stereoscopy and, more particularly, to applications of the latter to cinematography.

One of the objects of the invention is to provide a method and means for producing images giving a similar impression of depth as a stereoscopic projection.

Other objects will appear in the course of the detailed description now to be given with reference to the accompanying drawings, in which:—

Fig. 1 represents a side view of one constructive embodiment of the invention;

Fig. 2 is an elevation of the device shown in Fig. 1;

Fig. 3 is a section taken on line 3—3 of Fig. 2;

Figs. 4 and 5 are sections showing two possible positions of the film;

Fig. 6 illustrates a device for periodically bending the film;

Fig. 6a shows an apparatus for displacing the film and objective towards and away from one another.

Figs. 7 and 8 show, diagramatically, two other illustrative embodiments of the invention.

The principle upon which the present invention is based is the following: If different parts of a photosensitive surface are focussed on a series of parallel frontal planes and projections are made from a negative so produced, the projected image produces an illusion of depth simulating those obtained in stereophotography.

The variations of focus on the photosensitive surface may be obtained by manipulation of the film, of the optical system, or of both.

Figs. 1 to 6 show how the film may be brought into focus onto planes of varying depth, while Figs. 7 and 8 illustrate how the effect of depth may be obtained without manipulation of the film.

Referring to Figs. 1 to 5 of the drawings, there is shown a film having the usual perforations formed therein,—a film moving and guiding system 2, 3, 4, 5,—a flexible element 6 mounted between vertical frame portions 7, 7 and serving to bend the film and support the rear surface thereof, an objective a pair of flexible front supporting elements 8, 9 framing that portion of the film to be exposed 10 and supported by lateral frame 7, 7, two pairs of carriages $7^1$ and $7^2$ slidably mounted in guideways 11, 11 which are rigidly mounted on a frame 12, a shaft 13 having oppositely directed threads formed thereon engaging with the right and left hand portions of carriages $7^2$, a threaded wheel $13^1$ keyed to shaft 13 and driven by worm 14 mounted on shaft $14^1$, and a film-curvature control assembly consisting of a curved element 15 abutting against element 8 (or 9 or both) and having an elongated opening $15^{10}$ formed there-through, a cam 16 traversing $15^{10}$, and a lever 16 capable of occupying any one of three positions $16^1$, $16^2$ or $16^3$.

The above described apparatus operates on the principle that a field brought into focus at the central portion of a cylindrical film will present an image having sharp contours for the portion in focus and less sharp images for the remaining portions of the film surface. Such a film projected flat gives the visual impression of depth, symmetrical points on opposite sides of the film center-line being in focus with objects at varying distances. Obviously, the best results are obtainable only where the differences in depth of the field being photographed are not too great.

The film surface may be bent in either direction by means of the apparatus hereinabove described. When cam 16 is fixed in position $16^1$ (Fig. 1) and shaft 13 is articulated to move opposite side of carriages 72, 72 together, flexible guides 6, 8, 9 will move so that the film takes the concave form represented in Fig. 5, cam 16 acting as a stop to prevent movement of the film surface forwardly i. e. towards the objective. With the cam in the position corresponding to that of $16^2$, the opposite effect will be produced and the film bulge forwardly so as to have the convex form shown in Fig. 4. Finally when cam 16 moves into the position $16^3$, it is free to bulge in either direction. This is of considerable importance when it is desired to vary the form of the film, as will be indicated below, progressively and continuously from concave to convex, such variation reenforcing the impression of depth. Preferably, the change of curvature should terminate while the objective is inactive.

The assembly shown in Fig. 6 shows how this change of curvature may be accomplished. Here, the apparatus represented in Fig. 1 is modified by eliminating threaded shaft 13 so as to permit free movement of the various carriages, and rear flexible guide 6 is fitted centrally with a stem 17 having an eye 17° therein. Backward and forward movement of 17 and of the central portion of the film is effected by some such assembly as link 18 engaging with pin 19 adjustably mounted in slot 20° of ratchet 20, rotation of 20 being produced by an alternating movement of finger 21 communicated by link and lever assembly 22, 23, 24 and a maltese cross drive connected to the apparatus for advancing the film.

Fig. 6a shows a structure adapted to produce an effect similar to that shown in Figs. 1 to 6. The film, in this apparatus, moves through an ordinary film guiding frame 10 which is reciprocated back and forth continuously with relation to the objective by a drive similar to the one shown in Fig. 6 connected to the film advancing assembly. The end effect is to produce a series of groups of negatives, each group consisting of 2, 3, 4 or more images in focus with objects at different depths of the field. In projecting, these groups are passed behind the objective at the speed employed for single normal negatives.

An effect similar to that obtained with curved film may be produced with flat film and an ordinary objective by any of the following procedures:

1° by maintaining the objective in fixed position and reciprocating the film toward and away from the objective (Fig. 6a).

2° by a combination of flat film and an ordinary objective in which a series of openings 26 (Figs. 3, 7 and 8) formed in a rotatable screen 25′ (Fig. 8) or translatable (Fig. 7) screen 25 are interposed between film and objective synchronously with the former so as to cut off successive symmetrical portions of the field extending from the center to the periphery thereof.

Each of the procedures above described result in a series of images in which 2, 3, 4 or more successive negatives are in focus with portions of the field lying in a series of planes of progressive depth and it suffices only to record and project at a velocity increasing in proportion to the number of negatives 2, 3, 4 or more as the case may be brought into focus at various depths of the field to produce a visual impression of depth similar to that obtained by ordinary stereoscopic apparatus.

What I claim is:—

1. In a cinematographic apparatus provided with means for advancing a film and an objective, a film manipulating assembly comprising a curved transverse, flexible film guide, and means for altering the curvature of said transverse film guide.

2. In a cinematographic apparatus provided with an objective and means for advancing a film, a film manipulating assembly comprising a pair of lateral frame elements, a transverse, flexible, film guide engaging at opposite extremities with said frame elements, and means operatively to displace said frame elements simultaneously toward one another so as to alter the curvature of said film guide.

3. A structure as defined in claim 2 in combination with means operative to exert pressure on said transverse film guide in the direction of said objective.

In testimony whereof I have signed this specification.

EMILE PIERRE LOUIS LE BARBIER.